United States Patent
Ummethala et al.

(10) Patent No.: US 9,952,253 B2
(45) Date of Patent: Apr. 24, 2018

(54) ACCELEROMETER LEVELING IN AN ACTIVELY CONTROLLED VEHICLE SUSPENSION

(71) Applicant: ClearMotion Acquisition I LLC, Woburn, MA (US)

(72) Inventors: Upendra Ummethala, Cupertino, CA (US); David J. Warkentin, Boston, MA (US)

(73) Assignee: ClearMotion Acquisition I LLC, Woburn, MA (US)

( * ) Notice: Subject to any disclaimer, the term of this patent is extended or adjusted under 35 U.S.C. 154(b) by 204 days.

(21) Appl. No.: 14/957,733

(22) Filed: Dec. 3, 2015

(65) Prior Publication Data

US 2016/0091530 A1 Mar. 31, 2016

Related U.S. Application Data (63) Continuation of application No. 13/676,582, filed on Nov. 14, 2012, now Pat. No. 9,316,667.

(51) Int. Cl.
*G01M 17/04* (2006.01)
*G01P 21/00* (2006.01)

(52) U.S. Cl.
CPC .................. *G01P 21/00* (2013.01)

(58) Field of Classification Search
USPC ............... 73/115.01, 117.01, 117.03, 118.01
See application file for complete search history.

(56) References Cited

U.S. PATENT DOCUMENTS

| | | |
|---|---|---|
| 5,038,306 A | 8/1991 | Kellett |
| 6,169,939 B1 | 1/2001 | Raad et al. |
| 6,176,837 B1 | 1/2001 | Foxlin |
| 7,010,409 B2 | 3/2006 | Lu et al. |
| 7,650,253 B2 | 1/2010 | Weed et al. |
| 7,707,867 B2 | 5/2010 | Babala et al. |
| 7,813,851 B2 | 10/2010 | DeMersseman et al. |
| 2003/0061859 A1 | 4/2003 | Rothoff |
| 2003/0236604 A1 | 12/2003 | Lu et al. |
| 2004/0102888 A1 | 5/2004 | Burgdorf et al. |
| 2008/0201033 A1 | 8/2008 | DeMersseman et al. |
| 2011/0153156 A1 | 6/2011 | Haller et al. |
| 2013/0261875 A1* | 10/2013 | Kamischke ........... B60W 30/02 701/29.1 |
| 2015/0146441 A1* | 5/2015 | Saeki ..................... B60Q 1/115 362/466 |
| 2015/0153381 A1* | 6/2015 | Pollatsek ................ G01P 15/18 702/141 |

FOREIGN PATENT DOCUMENTS

EP 1227328 A1 7/2002

* cited by examiner

*Primary Examiner* — Eric S McCall
(74) *Attorney, Agent, or Firm* — Wolf, Greenfield & Sacks, P.C.

(57) ABSTRACT

In an aspect, in general, a system and method compensate for a misalignment characteristic of one or more acceleration sensors fixed to a sprung mass of a vehicle, each acceleration sensor having a location on the vehicle and a desired orientation relative to the vehicle.

8 Claims, 8 Drawing Sheets

ACCELEROMETER LEVELING IN AN ACTIVELY CONTROLLED VEHICLE SUSPENSION

CROSS-REFERENCE TO RELATED APPLICATION

This application is a continuation of and claims priority of application Ser. No. 13/676,582, filed on Nov. 14, 2012, the disclosure of which is incorporated herein by reference.

BACKGROUND

This invention relates to accelerometer leveling, and in particular accelerometer leveling in an actively controlled vehicle suspension system.

Many conventional vehicles such as automobiles include passive suspension systems which include a system of springs, shock absorbers and linkages which connect the vehicles to their wheels. The suspension system typically ensures that the vehicle can adequately and safely drive over a wide range of road conditions (i.e., can handle well) while also ensuring that the passengers of the vehicle are comfortable (i.e., the ride isn't overly rough or noisy).

In general, as the suspension is tuned to increase passenger comfort, the handling of the vehicle is sacrificed. Conversely, as the suspension is tuned to increase the handling ability of the vehicle, the passenger comfort is sacrificed. Thus, designing vehicle suspensions can be seen as a tradeoff between passenger comfort and handling ability. However, even with the most finely tuned suspensions, when a vehicle accelerates, decelerates, or turns, the chassis of the automobile tends to pitch, heave, and/or roll. Such changes in the orientation of the vehicle's chassis can cause decreased passenger comfort and decreased handling performance.

One solution to the shortcomings of passive vehicle suspension systems is to use active vehicle suspension systems. Active vehicle suspension systems sense motion of the vehicle's chassis (e.g., using accelerometers and other inertial sensors) and control actuators at each of the wheels of the vehicle based on the sensed motion. The actuators are controlled to mitigate undesirable pitch, roll, and heave of the vehicle chassis while at the same time isolating the chassis from road roughness, thereby improving passenger comfort and handling performance.

SUMMARY

In a general aspect, an approach to mitigating mounting orientation errors for the inertial sensors is based on signals acquired during a calibration operation, and the sensors are adjusted mechanically and/or using signal processing techniques.

In an aspect, in general, a method compensates for a misalignment characteristic of one or more acceleration sensors fixed to a sprung mass of a vehicle, each acceleration sensor having a location on the vehicle and a desired orientation relative to the vehicle. The method includes, for each acceleration sensor of the one or more acceleration sensors, receiving data characterizing misalignment of the acceleration sensor from the desired orientation of the acceleration sensor, receiving a signal from the acceleration sensor representing an acceleration acting on the acceleration sensor, the signal including components representing acceleration in a direction other than the desired orientation of the acceleration sensor related to a misalignment of the acceleration sensor, receiving signals representing inertial measurements from one or more inertial sensors in the vehicle, and combining the signals from the inertial sensors and the signal from the acceleration sensor based on the data characterizing misalignment of the acceleration sensor to form a corrected acceleration signal substantially representing the acceleration in the desired orientation at the location of the acceleration sensor.

Aspects may include one or more of the following features.

The method may include for each acceleration sensor of the one or more acceleration sensors, forming a control signal based on the corrected acceleration signal, and providing the control signal to an active suspension element associated with the acceleration sensor. The method may include, for each acceleration sensor of the one or more acceleration sensors, determining the data characterizing misalignment of the acceleration sensor based on a signal received from the acceleration sensor and signals received from the one or more inertial sensors. Determining the data characterizing misalignment of the acceleration sensor may include adaptively determine the data characterizing misalignment of the acceleration sensor during operation of the vehicle.

Determining the data characterizing misalignment of the acceleration sensor may include determining the data characterizing misalignment of the acceleration sensor at a calibration time and subsequently updating the data characterizing misalignment of the acceleration sensor during operation of the vehicle. The data characterizing misalignment of the acceleration sensor may be at least in part based on information determined by performing a tilt test of the vehicle. The tilt test may include determining misalignment information including receiving the signal from the acceleration sensor as the vehicle chassis is rotated through a number of known orientations, and determining the misalignment in formation including determining an orientation of the vehicle chassis where the signal from the acceleration sensor is at an extreme value.

Determining the data characterizing misalignment of the acceleration sensor may include determining an estimate of a reference acceleration acting on the acceleration sensor based on one of the signals representing inertial measurements and a distance between a location of the inertial sensor and the location of the acceleration sensor, and determining the data characterizing misalignment based on the estimate of the true linear acceleration and the signal from the acceleration sensor. The signal representing the inertial measurement may include a second linear acceleration signal, a rotational acceleration signal, and a rotational velocity signal.

Receiving inertial measurements from one or more inertial sensors may include receiving inertial measurements from a first inertial sensor during a calibration time and receiving inertial measurements from a second inertial sensor during a time that the vehicle is operated. The first inertial sensor may be a removable inertial sensor and the second inertial sensor may be a fixed inertial sensor associated with a vehicle stability control system. The sprung mass may include four corners, each corner including a suspension actuator coupled to the sprung mass, a wheel coupled to the suspension actuator, and an acceleration sensor of the one or more acceleration sensors coupled to the sprung mass in the vicinity of the location where the suspension actuator is coupled to the sprung mass.

In another aspect, in general, a computer-readable medium has encoded thereon instructions for causing a data processing system to compensate for a misalignment characteristic of one or more acceleration sensors fixed to a sprung mass of a vehicle, each acceleration sensor having a location on the vehicle and a desired orientation relative to the vehicle. Compensating for the misalignment characteristic of one or more acceleration sensors includes, for each acceleration sensor of the one or more acceleration sensors, receiving data characterizing misalignment of the acceleration sensor from the desired orientation of the acceleration sensor, receiving a signal from the acceleration sensor representing an acceleration acting on the acceleration sensor, the signal including components representing acceleration in a direction other than the desired orientation of the acceleration sensor related to a misalignment of the acceleration sensor, receiving signals representing inertial measurements from one or more inertial sensors in the vehicle, and combining the signals from the inertial sensors and the signal from the acceleration sensor based on the data characterizing misalignment of the acceleration sensor to form a corrected acceleration signal substantially representing the acceleration in the desired orientation at the location of the acceleration sensor.

In another aspect in general, a system includes one or more acceleration sensors, each fixed to a location on a sprung mass of a vehicle and having a desired orientation relative to the vehicle, one or more inertial sensors for generating signals representing inertial measurements, a controller configured to receive data characterizing misalignment of the acceleration sensor from the desired orientation of the acceleration sensor, a signal from the acceleration sensor representing an acceleration acting on the acceleration sensor, the signal including components representing acceleration in a direction other than the desired orientation of the acceleration sensor related to a misalignment of the acceleration sensor.

In another aspect, in general, a system is configured to compensate for a misalignment characteristic of one or more acceleration sensors fixed to a sprung mass of a vehicle, each acceleration sensor having a location on the vehicle and a desired orientation relative to the vehicle. The system includes, for each acceleration sensor of the one or more acceleration sensors, a first input for receiving data characterizing misalignment of the acceleration sensor from the desired orientation of the acceleration sensor, a second input for receiving a signal from the acceleration sensor representing an acceleration acting on the acceleration sensor, the signal including components representing acceleration in a direction other than the desired orientation of the acceleration sensor related to a misalignment of the acceleration sensor, a third input for receiving signals representing inertial measurements from one or more inertial sensors in the vehicle, and a controller for combining the signals from the inertial sensors and the signal from the acceleration sensor based on the data characterizing misalignment of the acceleration sensor to form a corrected acceleration signal substantially representing the acceleration in the desired orientation at the location of the acceleration sensor.

Aspects may include one or more of the following features.

The controller may be further configured to, for each acceleration sensor of the one or more acceleration sensors, form a control signal based on the corrected acceleration signal, and provide the control signal to an active suspension element associated with the acceleration sensor. The controller may be configured to, for each acceleration sensor of the one or more acceleration sensors, determine the data characterizing misalignment of the acceleration sensor based on a signal received from the acceleration sensor and signals received from the one or more inertial sensors.

The controller may be further configured to determine the data characterizing misalignment of the acceleration sensor including adaptively determining the data characterizing misalignment of the acceleration sensor during operation of the vehicle. The controller may be further configured to determine the data characterizing misalignment of the acceleration sensor including determining the data characterizing misalignment of the acceleration sensor at a calibration time and subsequently updating the data characterizing misalignment of the acceleration sensor during operation of the vehicle.

The data characterizing misalignment of the acceleration sensor received at the first input may be at least in part based on information determined by performing a tilt test of the vehicle. The controller may be further configured to determine the data characterizing misalignment of the acceleration sensor, including being configured to determine an estimate of a reference acceleration acting on the acceleration sensor based on one of the signals representing inertial measurements and a distance between a location of the inertial sensor and the location of the acceleration sensor, and determine the data characterizing misalignment based on the estimate of the true linear acceleration and the signal from the acceleration sensor. The signal representing the inertial measurement may include second linear acceleration signal, a rotational acceleration signal, and a rotational velocity signal.

The system may be configured to receive inertial measurements from one or more inertial sensors including receiving inertial measurements from a first inertial sensor during a calibration time and receiving inertial measurements from a second inertial sensor during a time that the vehicle is operated. The first inertial sensor may be a removable inertial sensor and the second inertial sensor may be a fixed inertial sensor associated with a vehicle stability control system. The sprung mass may include four corners, each corner including a suspension actuator coupled to the sprung mass, a wheel coupled to the suspension actuator, and an acceleration sensor of the one or more acceleration sensors coupled to the sprung mass in the vicinity of the location where the suspension actuator is coupled to the sprung mass.

Other features and advantages of the invention are apparent from the following description, and from the claims.

DESCRIPTION

Figure 1:
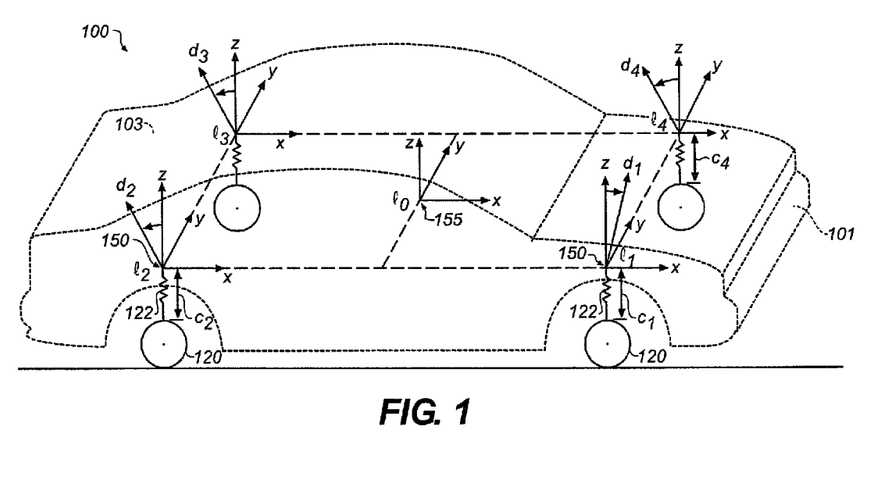
FIG. 1 is a perspective schematic diagram of a vehicle showing accelerometer locations and orientations.

Referring to FIG. 1, a vehicle 100 (e.g., an automobile), shown in a perspective schematic view, has a front end 101, a back end 103, and four corners, $l_1$-$l_4$. The vehicle 100 includes multiple linear accelerometers 150, which are generally located at each of the four corners, $l_1$-$l_4$, of the sprung mass (or body) of the vehicle 100. These accelerometers are used to provide acceleration measurement signals to a control system that provides control signals to actuators 122, which control orientation of the vehicle. In general, the control system is configured to control relatively low frequency (e.g., less than about 1 Hz) roll and pitch behavior of the vehicle, for example, resulting from turning and acceleration of the vehicle. In addition to roll and pitch control, the actuators 122 are controlled at higher frequencies, for example, to provide a smooth ride.

As illustrated in FIG. 1, the coordinate axes (i.e., unit vectors along the coordinate directions) x, y, z are oriented to the front, side, and vertical, respectively in the coordinate frame of the vehicle. The accelerometers at the wheels are affixed to the four corners, $l_1$-$l_4$, of the sprung mass (or body) of the vehicle 100, which is assumed to be rigid at the frequencies of interest for the control of roll and pitch. In particular, the vehicle has a front end 101 and a back end 103 and the accelerometers are located at locations $l_1$ (front right), $l_2$ (rear right), $l_3$ (rear left), and $l_4$ (front left) relative to a fixed origin in the vehicle frame of reference. (Note that vectors are represented using variables without necessarily explicitly differentiating the notation for scalar and vector quantities, but the distinction should be evident from the context). The accelerometer at location $l_i$ is rigidly affixed to the sprung mass (or body) of the vehicle 100 vehicle with a vector orientation $d_i$, with the sensitivity of the accelerometer being represented by the magnitude of $d_i$. The signal generated by the $i^{th}$ accelerometer with acceleration $a_i$ in the presence of a gravitational field g is therefore computed as a vector inner (dot) product $s_i = (a_i + g) \cdot d_i$, which can be represented as $s_i = |a_i + g| |d_i| \cos \theta$ where $\theta$ is the angle between the orientation of the accelerometer and the net acceleration and gravitational components.

In addition to the accelerometers at the four corners $l_1$-$l_4$, a central inertial measurement unit (IMU) 155 provides multiple acceleration signals, for instance a full six degrees of freedom (6-DOF) of linear acceleration and rotational velocity signals sensed at a central location $l_0$ in the vehicle.

In general, it is desirable to have the accelerometers affixed to the vehicle such that their orientations are each aligned with the z axis. If this is the case, then $s_i = a_i^{(z)}$, representing the z component of the acceleration at the corner, and not including any x or y axis component of centripetal acceleration or linear acceleration of the vehicle associated with driving maneuvers such as turning, braking, or accelerating. In normal operation, the control module 180 (described below) eliminates the effects of gravity either by subtracting a constant offset or by using a high-pass filter with a low corner frequency.

Figure 2:
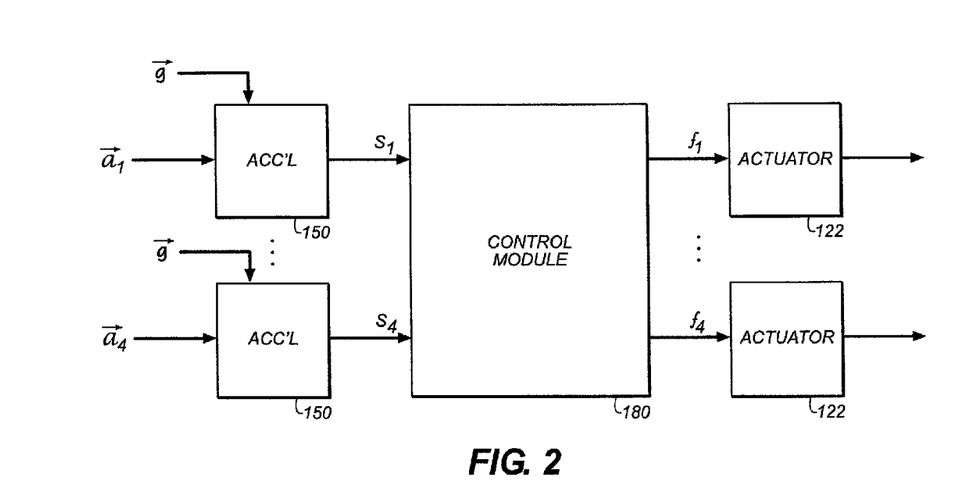
FIG. 2 is a block diagram of control signal paths.

Referring to FIG. 2, a block diagram of the control system includes a control module 180, which accepts the accelerator signals $s_i$ from the accelerometers 150, and provides the actuator control signals $f_i$, which are used to control the actuators 122. In various embodiments, the control module 180 implements different control laws, for example, using a force control created from a weighted sum of the difference between the commanded and measured acceleration at each corner (i.e., an error signal), its integral, and its derivative.

Figure 3:
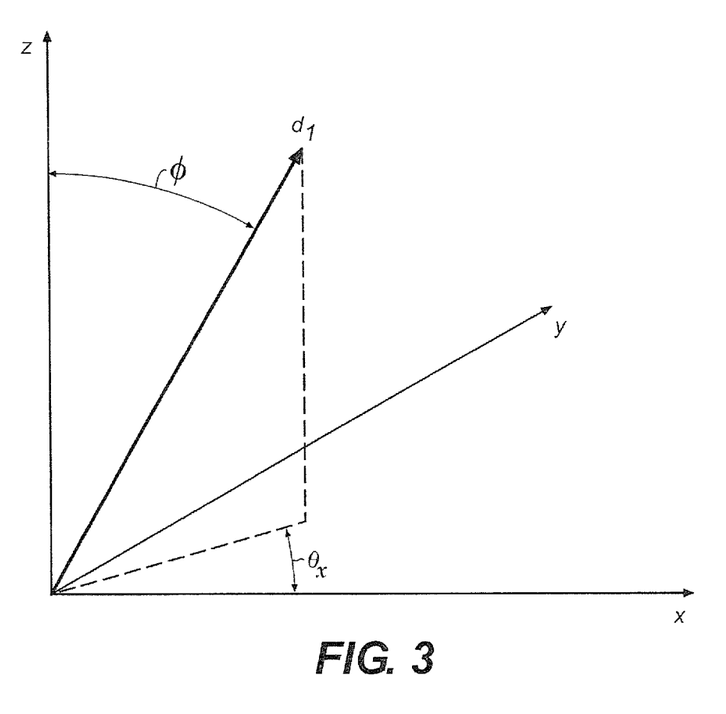
FIG. 3 is a graph of a misaligned accelerometer sensitivity vector.

Referring to FIG. 3, a detailed view of the orientation of the accelerometer at location $l_1$ is shown. Ideally, the accelerometer sensitivity vector $d_1$ is oriented such that it is aligned with the z axis. However, due to irregularities (e.g., mounting error or inaccuracy) of the placement of the accelerometer in the vehicle body, $d_1$ can be misaligned. In a spherical coordinate system, the misalignment of $d_1$ can be characterized by two angles: the angle between $d_1$ and the z axis, $\phi$, and the angle between $d_1$ and the x axis, $\theta_x$. In the situation where the accelerometer is not aligned with the vehicle's z axis, the accelerometer signal $s_i$ includes components of linear and centripetal acceleration of the vehicle as a whole, such that $s_i \neq a_i^{(z)}$. Thus, the signal produced by the misaligned accelerometer is not only sensitive to acceleration along the vehicle's vertical z axis, but is also sensitive to acceleration along the vehicle's x and y axes.

If a control module 180 operates under the assumption that the input signals from the accelerometers 150 are free of alignment errors such as that which is shown in FIG. 3, components of the accelerometer signal, $s_i$, which are unrelated to acceleration in the vehicle's z axis can be erroneously interpreted as acceleration in the vehicle's z axis. Due to the erroneous components of the accelerometer signals, the control module 180 can cause undesirable pitch, roll, and heave in the vehicle's orientation as it works to drive the accelerometer signal to the desired value.

The examples in the following sections are methods for detecting and compensating for accelerometer alignment errors, thereby mitigating undesirable behavior of a vehicle suspension system caused by accelerometer alignment errors.

Trial and Error Determination and Mitigation of Misalignment

In some examples, errors due to accelerometer misalignment are detected and mitigated by a trial and error alignment procedure. In such a procedure, a vehicle such as the vehicle 100 shown in FIG. 1 is driven by an expert who monitors the orientation of the vehicle 100 as it is driven. If the expert senses that the orientation of the vehicle 100 is adversely affected by accelerometer misalignment (e.g., the front of the vehicle 100 is excessively driven down during forward acceleration), the expert estimates the amount of accelerometer misalignment and has the accelerometers aligned by physically shimming the accelerometers. The expert then drives the vehicle 100 again to monitor the orientation of the vehicle 100 with the shimmed accelerometers. This process is repeated until the expert deems that the accelerometers are sufficiently aligned. Performing a trial and error process to align the accelerometers as described above can be an inefficient, time consuming, and imprecise procedure.

Tilt Based Determination and Mitigation of Misalignment

Figure 4:
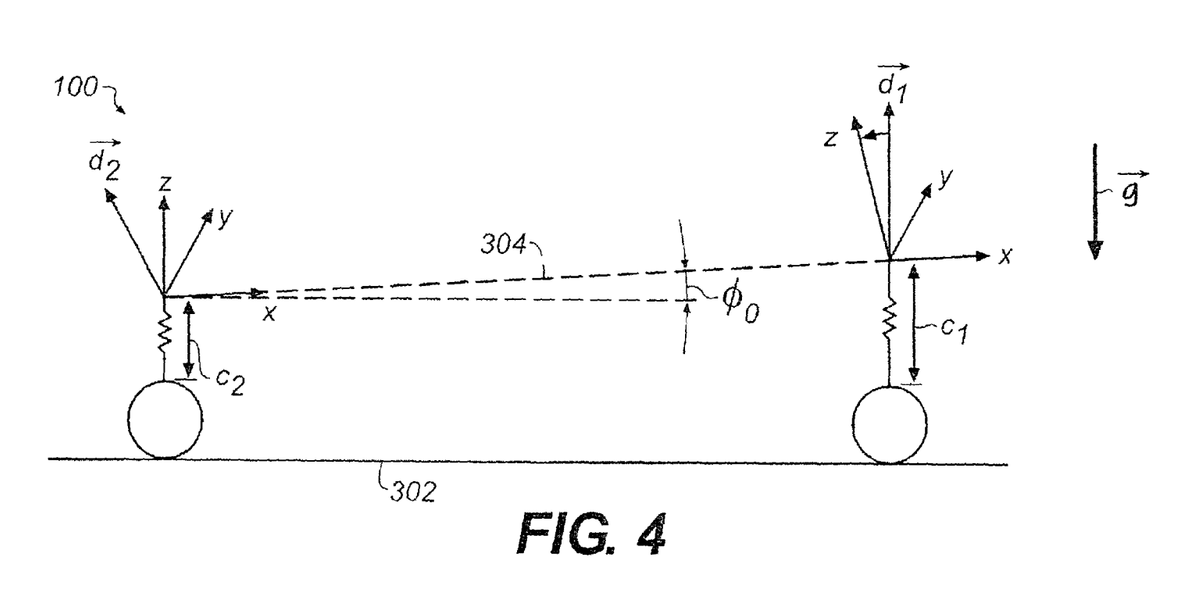
FIG. 4 is a side view schematic diagram of an vehicle in a tilt configuration.

Referring to FIG. 4, one alternative process for aligning the accelerometers involves placing the vehicle 100 on a level surface 302 (or a surface of known orientation) and tilting the frame 304 of the vehicle 100 through a range of known angles to determine an angle of accelerometer misalignment. In particular, the actuators $C_1$ and $C_2$ can be instructed to precisely tilt the frame 304 of the vehicle 100 through the range of known angles relative to the level surface 302. For example, FIG. 4 illustrates a situation in which the actuator $C_1$ is extended to a greater extent than the actuator $C_2$, causing the vehicle to tilt the frame 304 of the vehicle 100.

In some examples, the range of known angles is determined such that it is known to include a tilt angle, $\phi_0$, which corresponds to a situation where the accelerometer sensitivity vector, $d_1$ is vertically oriented. In other examples, the range of known angles need not include the angle which corresponds to a situation where the accelerometer sensitivity vector, $d_1$ is vertically oriented. In this situation, a curve can be fit to the measured acceleration values and the maximum is determined using interpolation or extrapolation. In FIG. 4, the actuators, $C_1$ and $C_2$, are configured such that the vehicle is tilted at the angle $\phi_0$ and the accelerometer sensitivity vector $d_1$ is vertically oriented.

Figure 5:
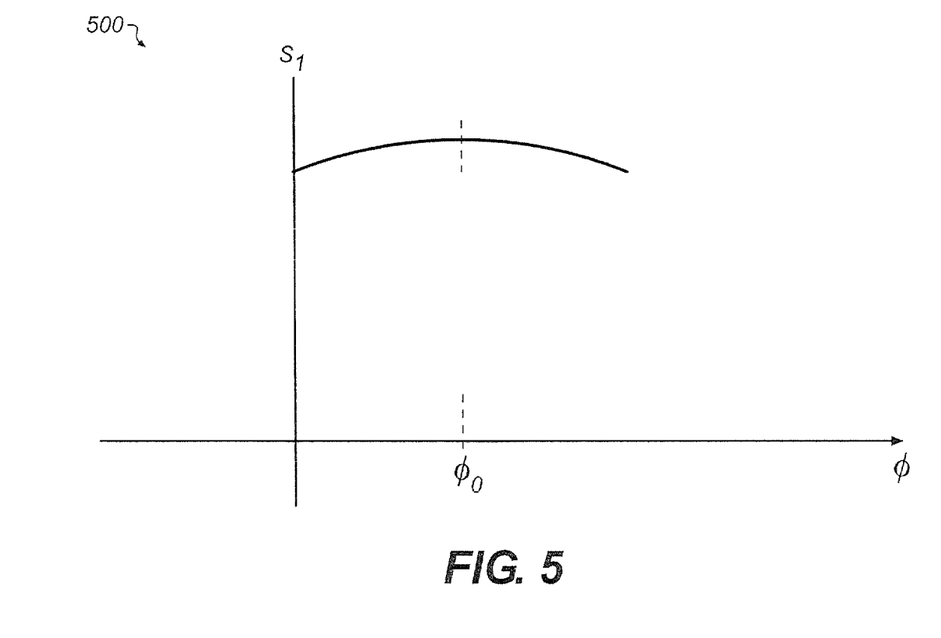
FIG. 5 is a graph of an accelerometer signal as a function of tilt angle.

Referring to FIG. 5, a graph 500 shows the value of the accelerometer signal, $s_1$, as a function of tilt angle, $\phi$, which is described by the following equation:

$$s_1 = d_1 g \cos(\phi - \phi_0) + \text{offset}$$

The graph shows that $s_1$ reaches a maximum value at the angle, $\phi_0$, where the accelerometer is optimally vertically aligned. It is noted that during this procedure, the only substantial inertial force exerted on the accelerometer is the gravitational pull of the Earth, g. Thus, at the tilt angle $\phi_0$, the sensitivity vector of the accelerometer, $d_1$, is optimally aligned with g. The resulting angle, $\phi_0$, is an estimate of the angle of misalignment of the accelerometer.

In some examples, after determining $\phi_0$, the accelerometer is physically shimmed such that it is vertically aligned (i.e., $d_1$ and the z axis of the vehicle are aligned) when the vehicle is on a level surface. In other examples, $\phi_0$ is provided (e.g., manually or from flash memory) to the control module (e.g., FIG. 2, element 180) and the control module 180 compensates for $\phi_0$ programmatically by processing the signal to subtract estimates of the x and y acceleration components.

In the above illustration, the misalignment of $d_1$ is represented as a single angle (i.e., $\phi_0$) between $d_1$ and the z axis. However, in general, the misalignment can be represented as a vector in three dimensions as was shown in FIG. 3. Thus, in this general case, rather than rotating the frame of the vehicle in a two dimensional plane, the frame of the vehicle is rotated in three dimensions. In this way, both the angles $\theta$ and $\phi$ shown in FIG. 3 can be discovered and compensated for.

In some examples, if the orientation of the surface on which the vehicle 100 rests is unknown, a tilt test is performed twice with the vehicle 100 facing in opposite directions for the two tests. The average of the two tests yields the true misalignment of the accelerometers and half the difference yields the orientation of the surface.

Determination of Accelerometer Misalignment From Driving Data

Determining the angle of accelerometer misalignment using the tilt method described in section 2 can be difficult because the curve shown in FIG. 5 can be relatively flat (i.e., the derivative with respect to the angle has a small magnitude) making it difficult to clearly identify a maximum value. Furthermore, the accelerometers are typically in close proximity to the actuators 122 which, when in operation, can interfere with the accelerometer signals (e.g., due to electromagnetic interference).

Thus, in some examples, it is advantageous to measure the accelerometer signals during acceleration of the vehicle 100 thereby exerting additional inertial forces on the vehicle 100. For example, this can be accomplished by measuring the acceleration of the vehicle 100 over the course of the vehicle 100 being driven through a series of maneuvers (e.g., as the vehicle accelerates, brakes, turns, etc.) while at the same time recording accelerometer signals.

In some implementations, the IMU (FIG. 1, element 155) is used to obtain measurements of the acceleration of the vehicle. However, the IMU 155 can suffer from similar misalignment issues as the accelerometers. Thus, in some examples, the IMU 155 is first calibrated using a tilt calibration as is described in FIG. 4. Note that the IMU 155 is not in close proximity to the actuators $C_1$-$C_4$ and the calibration therefore is less susceptible to errors due to interference. Also note that in some examples, the IMU 155 is temporarily mounted to the vehicle 100 while in other examples, the IMU 155 is permanently mounted to the vehicle 100.

With the IMU 155 in the vehicle, the vehicle 100 is driven through the series of maneuvers. As the vehicle 100 is driven, the IMU 155 records acceleration along its x, y, and z axes, and the three components of its angular velocity, $\omega$. At the same time, the accelerometers at each corner of the vehicle 100 measure acceleration along their sensitivity axes (i.e., $d_i$) and generate accelerometer output signals, $s_i$. The accelerometer output signals are recorded for later use.

In some examples, the recorded IMU data and the recorded accelerometer data are downloaded from the vehicle 100 and post-processed (e.g., by a technician) to determine the misalignment of the sensitivity vectors of each of the accelerometers (i.e., FIG. 3, $\phi$ and $\theta$). In other examples, the processing of the recorded IMU data and the recorded accelerometer data is performed in an automated fashion by a computer which is on board the vehicle 100.

For example, the acceleration of the IMU can be extrapolated to x, y, and z axis acceleration components at each of the accelerometer locations, i, as follows:

$$\hat{a}^{(i)} = a^{(IMU)} + \dot{\omega} \times r_i + \omega \times \omega \times r_i$$

where $\hat{a}^{(i)}$ is a vector of extrapolated accelerations along the x, y, and z axes of the $i^{th}$ accelerometer location, $a^{(IMU)}$ is a vector of accelerations measured along the x, y, and z axes at the location of the IMU, $\dot{\omega}$ is a vector of angular accelerations measured at the IMU location, $\omega$ is a vector of angular velocities measured at the location of the IMU, and $r_i$ is the position vector between the IMU location and the $i^{th}$ accelerometer location. The × operators in the equation represent a vector cross product.

The components of the measured acceleration, $a^{(i)}$, and the components of the extrapolated acceleration, $\hat{a}^{(i)}$, are then low-pass filtered, preserving only frequencies at which the chassis of the vehicle behaves as a rigid body.

The time history of the acceleration measured at the IMU location is assumed to be related to the time history of the components of the extrapolated acceleration plus an offset term, $k_{offset}$, and a drift term, $k_{drift}t$ as follows:

$$s^{(i)} = k_x \hat{a}_x^{(i)} + k_y \hat{a}_y^{(i)} + k_z \hat{a}_z^{(i)} + k_{drift}t + k_{offset} + \text{error}$$

A least squares fit can be used to find the coefficients $k_x$, $k_y$, and $k_z$ that minimize the mean squared error. Ideally, the coefficients of the extrapolated acceleration components $k_x$, $k_y$, and $k_z$ are direction cosines with the sum of the squares of the coefficients equal to one. This constraint is enforced by normalizing the coefficients as follows:

$$k_x \leftarrow \frac{k_x}{\sqrt{k_x^2 + k_y^2 + k_z^2}}$$

$$k_y \leftarrow \frac{k_y}{\sqrt{k_x^2 + k_y^2 + k_z^2}}$$

$$k_z \leftarrow \frac{k_z}{\sqrt{k_x^2 + k_y^2 + k_z^2}}$$

Figure 6A:
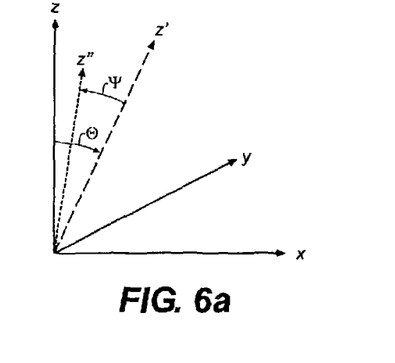
FIGS. 6a and 6b are an alternative geometrical representation of a misaligned accelerometer.
Figure 6B:
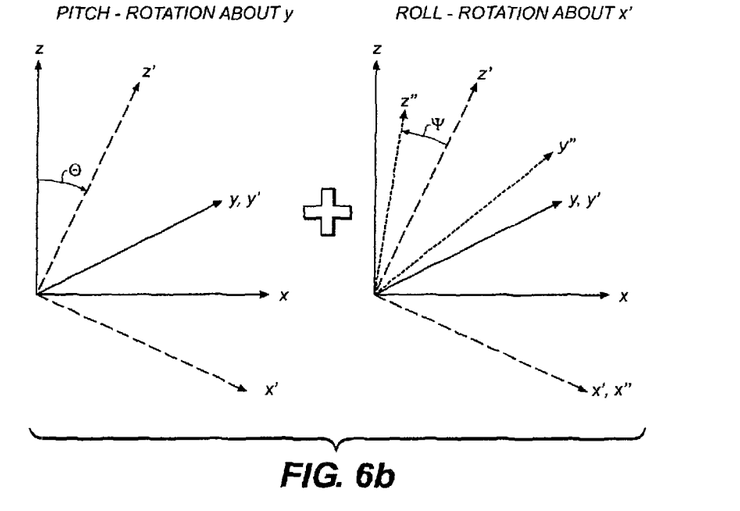

Referring to FIG. 6a, an alternative depiction of accelerometer misalignment illustrates the misalignment in terms of a pitch angle, $\Theta$, and a roll angle, $\Psi$. In particular, the x, y, and z axes of the figure are fixed to the vehicle body and an accelerometer is misaligned along the z" axis. Referring to FIG. 6b, the z" axis can be defined as two separate rotations. The first rotation is a pitch rotation about the y axis, resulting in the x', y', and z' axes. The second rotation is a roll rotation about the x' axis, resulting in the final x", y", and z" axes.

The normalized coefficients described above are used to determine the roll angle, $\Psi_i$, and the pitch angle, $\Theta_i$, of the accelerometer at location i (with respect to the IMU) as follows:

$$\Psi_i = -\sin^{-1}(k_y)$$

$$\Theta_i = \frac{\sin^{-1}(k_x)}{\cos(\phi_i)}$$

The determined angles can then be used to shim the accelerometers or to programmatically compensate for the accelerometer misalignments. In some examples, programmatic compensation is accomplished by adding the known misalignment of the IMU to the misalignment measured (with respect to the IMU) of the accelerometers at locations, i, yielding the total misalignment of the accelerometers, as follows:

$$\Psi_i = \Psi_i + \Psi_{IMU}$$

$$\Theta_i = \Theta_i + \Theta_{IMU}$$

In some examples, the known misalignment of the IMU is obtained from a previously performed calibration step. The IMU can be adjusted based on the result of the calibration step, obviating the need to add the known misalignment of the IMU to the misalignment (with respect to the IMU) of the accelerometers at locations, i.

Adaptive Compensation of Accelerometer Misalignment From Driving Data

Example 1

Figure 7:
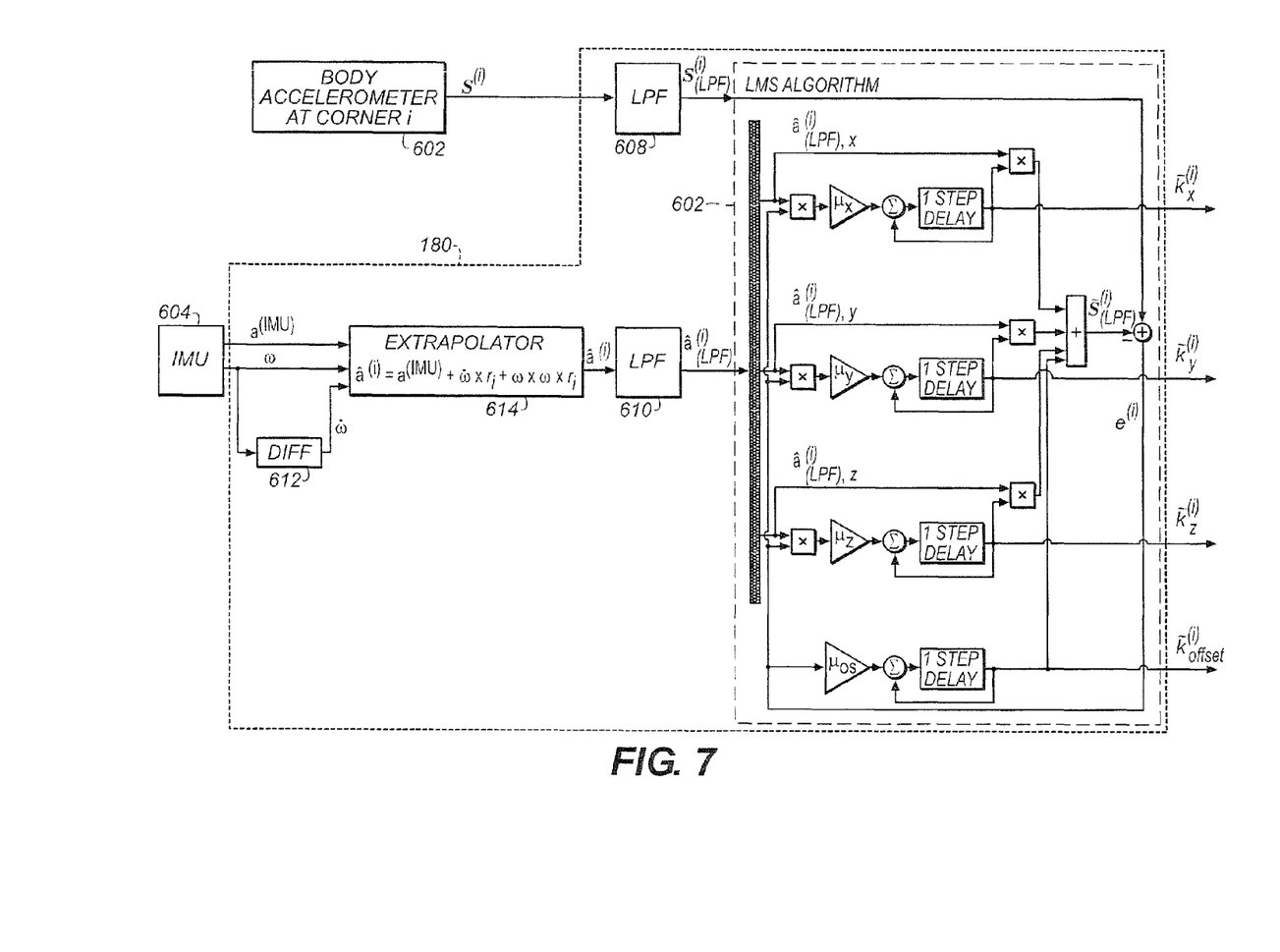
FIG. 7 is a block diagram of a first accelerometer system configured to adaptively compensate for accelerometer misalignment.

Referring to FIG. 7, in one example, a control module (e.g., FIG. 2, element 180) receives an accelerometer signal, $s^{(i)}$, from an accelerometer, $l_i$, located at the $i^{th}$ corner of the vehicle 100. The control module 180 also receives a translational acceleration vector, $a^{(IMU)}$, and an angular velocity vector, $\omega$, from an IMU 604 fixed at a central location on the vehicle 100. The control module 180 processes the inputs to generate the coefficients $k_x$, $k_y$, and $k_z$ and $k_{offset}$ (described above), which can be used to determine the misalignment of the accelerometer, $l_i$.

In operation, the angular velocity vector, $\omega$ is first passed to a differentiation module 612 which computes angular acceleration vector, $\dot{\omega}$, by taking the derivative of $\omega$. The quantities $a^{(IMU)}$, $\omega$, $\dot{\omega}$, and a distance between the IMU 604 and the body accelerometer 602, $r_i$ (known a priori) are then provided to an extrapolation module 614 which determines an extrapolated acceleration vector, $\hat{a}^{(i)}$, present at the $i^{th}$ body accelerometer at location $l_i$ according to the following equation:

$$\hat{a}^{(i)} = a^{(IMU)} + \dot{\omega} \times r_i + \omega \times \omega \times r_i$$

The extrapolated acceleration vector, $\hat{a}^{(i)}$, represents the acceleration that would be present at $l_i$ if the vehicle 100 were a perfectly rigid body.

The extrapolated acceleration vector, $\hat{a}^{(i)}$, and the accelerometer signal, $s^{(i)}$, are provided to separate low-pass filter modules 610, 608 which low-pass filter the signals to eliminate the effects of vehicle body flexibility from $\hat{a}^{(i)}$ and $s^{(i)}$, resulting in $\hat{a}_{LPF}^{(i)}$ and $s_{LPF}^{(i)}$.

The low-pass filtered results, $\hat{a}_{LPF}^{(i)}$ and $s_{LPF}^{(i)}$ are passed to an adaptive Least Mean Squares (LMS) algorithm module 602 which processes the signals to determine the degree to which the x, y and z components of the extrapolated acceleration vector are included in the low-pass filtered body accelerometer signal, $s_{LPF}^{(i)}$. The adaptive LMS algorithm module 602 operates on the assumption that the time history of $s_{LPF}^{(i)}$ is related to the time history of the components of the extrapolated, low-pass filtered IMU acceleration vector $\hat{a}_{LPF}^{(i)}$ plus an offset term $k_{offset}$ as follows:

$$s_{LPF,i} = k_x \hat{a}_{LPF,x}^{(i)} + k_y \hat{a}_{LPF,y}^{(i)} + k_z \hat{a}_{LPF,z}^{(i)} + k_{offset} + \text{error}$$

where the coefficients $k_x$, $k_y$, and $k_z$ and the offset $k_{offset}$ are determined by the adaptive LMS module 602 based on $\hat{a}_{LPF}^{(i)}$ and $s_{LPF}^{(i)}$.

In some examples, the adaptive LMS module 602 implements an iterative procedure in which the current estimates of the coefficients and offset, $\tilde{k}_x$, $\tilde{k}_y$, $\tilde{k}_z$, $\tilde{k}_{offset}$ are applied to the x, y, and z components of the low-pass filtered extrapolated acceleration vector, $\hat{a}_{LPF}^{(i)}$, to form an estimate $\tilde{s}_{LPF}^{(i)}$ of the low-pass filtered signal from the accelerometer at location $l_i$ as follows:

$$\tilde{s}_{LPF}^{(i)} = \tilde{k}_x^{(i)} \hat{a}_{LPF,x}^{(i)} + \tilde{k}_y^{(i)} \hat{a}_{LPF,y}^{(i)} + \tilde{k}_z^{(i)} \hat{a}_{LPF,z}^{(i)} + \tilde{k}_{offset}^{(i)}$$

This estimate is subtracted from the low-pass filtered signal from the accelerometer to form an error signal:

$$e^{(i)} = s_{LPF}^{(i)} - \tilde{s}_{LPF}^{(i)}$$

$e^{(i)}$ is then used in accordance with the standard LMS formulation to compute incremental updates for the estimates of the coefficients and offset as follows:

$$\tilde{k}_x^{(i)} \leftarrow \tilde{k}_x^{(i)} + \mu_x \hat{a}_{LPF,x}^{(i)} e^{(i)}$$

$$\tilde{k}_y^{(i)} \leftarrow \tilde{k}_y^{(i)} + \mu_y \hat{a}_{LPF,y}^{(i)} e^{(i)}$$

$$\tilde{k}_z^{(i)} \leftarrow \tilde{k}_z^{(i)} + \mu_z \hat{a}_{LPF,z}^{(i)} e^{(i)}$$

$$\tilde{k}_{offset}^{(i)} \leftarrow \tilde{k}_{offset}^{(i)} + \mu_{offset} e^{(i)}$$

where the non-negative gains $\mu_x$, $\mu_y$, $\mu_z$, and $\mu_{offset}$ are chosen to control the speed of convergence and stability of the incremental update process for each estimate.

In operation, as the vehicle 100 experiences horizontal accelerations due to maneuvering (turning, braking, accelerating), non-zero values of the error $e^{(i)}$ cause the estimates of the coefficients and offset to change via this incremental update process. As the estimates of the coefficients and offset improve, the estimate $\tilde{s}_{LPF}^{(i)}$ of the low-pass filtered signal from the accelerometer at location $l_i$ approaches the actual value $s_{LPF}^{(i)}$, and the magnitude of the error $e^{(i)}$ decreases. The estimates of the coefficients $\tilde{k}_x$, $\tilde{k}_y$, $\tilde{k}_z$ tend to converge to values that reflect the direction cosines indicating the orientation of the axis of the accelerometer at location $l_i$ with respect to the axes of the IMU 604. The coefficient values can then be used to determine the pitch and roll misalignment angles of the body accelerometer 602 as described in the previous section.

Example 2

In another example, the undesirable body motion of an actively controlled car caused by misaligned body accelerometers is used to determine and correct for the misalignment of the body accelerometers. As is noted above, when the body mounted accelerometers used for active suspension control are misaligned from their desired vertical orientation, vehicle maneuvers involving horizontal acceleration tend to introduce unwanted components into the body accelerometer measurements. When the unwanted components are erroneously interpreted by the control system as vertical accelerations, actuator commands are subsequently generated to cancel them, causing undesired vertical motions of the vehicle body. For example, on a flat road, a car with an active suspension and misaligned accelerometers may exhibit undesired vertical motions (e.g. heave, pitch, roll) in response to driving maneuvers (e.g. accelerating, braking, turning) involving horizontal accelerations.

The undesired motions can be detected by suspension position sensors, which measure the relative extension of each wheel with respect to the body. The corresponding measured suspension position signals may be compared to the measured horizontal accelerations to determine and compensate for the amount of misalignment.

Figure 8:
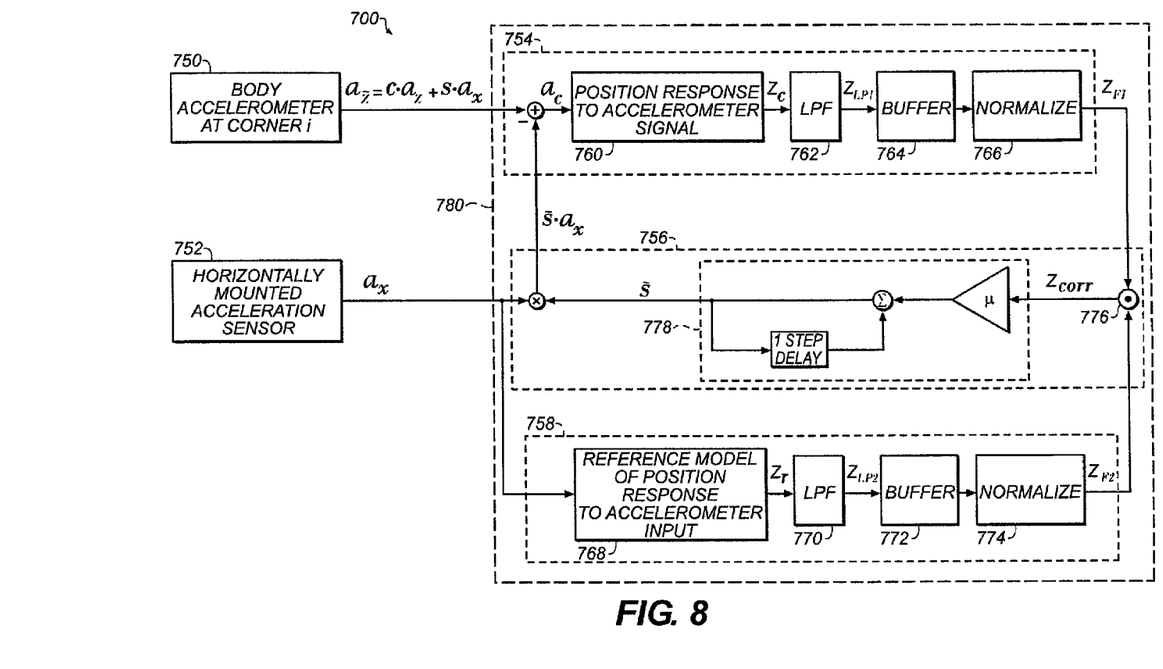
FIG. 8 is a block diagram of a second accelerometer system configured to adaptively compensate for accelerometer misalignment.

Referring to FIG. 8, a system 700 for determining and correcting for accelerometer misalignment receives as inputs a first accelerometer signal, $a_{\tilde{z}}$, from a body accelerometer 750 and a second accelerometer signal, $a_x$, from an acceleration sensor 752. In some examples, the second accelerometer signal, $a_x$, is an output or a combination of outputs from an IMU which is located centrally on the vehicle. In other examples, the second accelerometer signal, $a_x$, is a an output of a horizontally mounted accelerometer or an output of a combination horizontally mounted accelerometers located at the $i^{th}$ corner of the vehicle body. The body accelerometer 750 is located at the $i^{th}$ corner of the vehicle body.

In the example illustrated in FIG. 8, the body accelerometer 750, which generates $a_{\tilde{z}}$, is misaligned by an angle, $\theta$, from a vertical (i.e., z) axis of the vehicle 100. As the vehicle 100 drives through a number of maneuvers (i.e., braking, turning, accelerating, etc.) the first acceleration signal, $a_{\tilde{z}}$, generated by the body accelerometer 750 includes components related to acceleration in the horizontal (i.e., x) axis of the vehicle body (i.e., due to misalignment of the body accelerometer 750) as well as components in the vertical axis of the vehicle body. Thus, in this example, $a_{\tilde{z}}$ can be written as:

$$a_{\tilde{z}} = (\cos \theta)a_z + (\sin \theta)a_x$$

The second accelerometer signal, $a_x$, represents the actual acceleration along the horizontal axis of the vehicle.

The alignment system 780 processes the accelerometer signal inputs $a_{\tilde{z}}$ and $a_x$ to adaptively determine and compensate for the misalignment present in the body accelerometer 750. The alignment system 780 accomplishes this goal by causing a compensation signal, $\tilde{s}a_x$, to be as close as possible to the $sa_x$ component of $a_{\tilde{z}}$ such that removing the compensation signal from $a_{\tilde{z}}$ is equivalent to removing the components related to acceleration along the x axis of the vehicle from $a_{\tilde{z}}$.

The alignment system 780 includes a first forward path 754, a second forward path 758 and a feedback path 756. In the first forward path 754, the compensation signal $\tilde{s}a_x$ (generated as is described below) is subtracted from $a_{\tilde{z}}$.

The result of subtracting $\tilde{s}a_x$ from $a_{\tilde{z}}$ is a control signal, $a_c$, which is provided to a suspension positioning system 760 of an active vehicle suspension. The suspension positioning system 760 positions the vehicle suspension based on a, and returns an output of the suspension position $z_c$ as measured by a position sensor (not shown) included in the suspension positioning system 760. $z_c$ is then provided to a first low-pass filter module 762 which applies a low-pass filter to the position value. In some examples, the first low-pass filter module 762 implements a 3-pole Butterworth low-pass filter with a cutoff frequency at 0.5 Hz. The output of the first low-pass filter module 762 is passed to a first buffer module 764 which stores a predefined amount of time history of the output of the first low-pass filter module 762. In some examples, the first buffer module 764 is a first-in-first-out (FIFO) buffer which stores the most recent 0.25 seconds of output from the first low-pass filter module 762. All of the data in the first buffer module 764 is passed to a first normalization module 766 which computes a normalized version of the buffer data. In some examples, the normalized version of the buffer data is computed by dividing the values in the buffer by the sum of the squares of the values in the buffer. The output of the first normalization module 766, $z_{F1}$, is then passed out of the first forward path 754.

The second forward path 758 receives $a_x$ which represents the actual acceleration along the x axis of the vehicle 100. $a_x$ is passed to a reference model 768 which is a mathematical representation of the suspension positioning system 760. The reference model 768 computes the suspension position, $z_r$, which would result from providing $a_x$ as the control signal to the actual suspension positioning system 760.

The signal $z_r$ is then provided to a second low-pass filter module 770 which applies a low-pass filter to the position value. In some examples, the second low-pass filter module 770 implements a 3-pole Butterworth low-pass filter with a cutoff frequency at 0.5 Hz. The output of the second low-pass filter module 770 is passed to a second buffer module 772 which stores a predefined amount of time history of the output of the second low-pass filter module 770. In some examples, the second buffer module 772 is a first-in-first-out (FIFO) buffer which stores the most recent 0.25 seconds of output from second the low-pass filter module 770. All of the data in the second buffer module 772 is passed to a second normalization module 774 which computes a normalized version of the buffer data. In some examples, the normalized version of the buffer data is computed by dividing the values in the buffer by the sum of the squares of the values in the buffer. The output of the second normalization module 774, $z_{F2}$, is then passed out of the second forward path 758. In general, the characteristics of the second low-pass filter module 770, the second buffer module 772, and the second normalization module 774 can be altered (e.g., the cutoff frequency of the low-pass filter can be changed or the amount of time history stored by the buffer module can be changed). However, it is important that the characteristics of the second low-pass filter module 770, the second buffer module 772, and the second normalization module 774 are the same as the first low-pass filter module 762, the first buffer module 764, and the first normalization module 766.

The outputs of the first forward path 754, $z_{F1}$, and the second forward path 758, $z_{F2}$, are passed to the feedback path 756 which iteratively estimates the compensation signal $\tilde{s}a_x$. In the feedback path 756, $z_{F1}$ and $z_{F2}$ are passed to a dot multiplication module 776 which determines a correlation, $z_{corr}$ between the two inputs. The correlation, $z_{corr}$, is useful for comparing the pattern of the time history of the suspension position, $z_c$, with that of the reference suspension position, $z_r$. In some examples, if the buffers store values from the last N time steps, the correlation at time step i is computed as:

$$z_{corr}(i) = \sum_{n=0}^{N-1} \left( \frac{z_{LP1}(i-n)}{\sum_{l=0}^{N-1} z_{LP1}^2(i-l)} \right) \left( \frac{z_{LP2}(i-n)}{\sum_{m=0}^{N-1} z_{LP2}^2(i-m)} \right)$$

$$= \frac{\sum_{n=0}^{N-1} z_{LP1}(i-n) z_{LP2}(i-n)}{\sum_{n=0}^{N-1} z_{LP1}^2(i-n) \sum_{n=0}^{N-1} z_{LP2}^2(i-n)}$$

In general, larger values of indicate more similarity between the shape of the time responses of $z_c$ and $z_r$, and smaller values indicate less similarity. A large similarity between the two time responses indicates that the position of the suspension is largely influenced by misalignment of the body accelerometer 750. As the similarity between the two time responses decreases, the influence of the misalignment of the body accelerometer 750 on the position of the suspension decreases.

Thus, $z_{corr}$ can be used to compute an appropriate adjustment to a coefficient, $\tilde{s}$, of the compensation signal, $\tilde{s}a_x$ which is generated by the feedback path 756. In particular, large values of $z_{corr}$ cause large adjustments to $\tilde{s}$ and small values of $z_{corr}$ cause small adjustments to $\tilde{s}$. This is accomplished by a coefficient update module 778 which incrementally updates $\tilde{s}$ according to the following formula:

$\tilde{s} \leftarrow \tilde{s} + \mu z_{corr}$ where $\mu$ is a gain a system designer can use to adjust the speed of adaptation of the tilt coefficient estimate.

The compensating signal, $\tilde{s}a_x$, is generated by multiplying the horizontally mounted accelerometer signal, $a_x$, by the coefficient, $\tilde{s}$. The compensation signal, $\tilde{s}a_x$, is output from the feedback path 756 to the first forward path 754.

As the coefficient, $\tilde{s}$, approaches the actual value of s, the compensating signal, $\tilde{s}a_x$ cancels the unwanted component of $a_{\tilde{z}}$ (i.e., $sa_x$) in the first forward path 754. As a result, the suspension position response $z_c$ includes less of the characteristic response $z_r$, resulting in a smaller correlation $z_{corr}$ and smaller updates to the estimates $\tilde{s}$ as it converges toward s.

In the above example, it is assumed that the vehicle is under active control, that there is a means for subtracting the compensating signal, $\tilde{s}a_x$, from the body accelerometer signal, $a_{\tilde{z}}$, and that the response of suspension position $z_c$ to the control signal, $a_c$, is approximately linear and known in advance.

In some examples, when the driving surface is uneven (i.e., non-flat), the total suspension motion will include of a sum of a component resulting from horizontal acceleration detected by misaligned body accelerometers and a component resulting from the road profile; the method described here works in the presence of the latter component as long as the unevenness of the road profile is unrelated to the low frequency content of horizontal acceleration, as is typically the case.

While the system of FIG. 8 relates to a single body accelerometer at one corner of a vehicle, the system can be easily extended to all four corners of a vehicle. Furthermore, while the body accelerometer in the system of FIG. 8 is described as misaligned along the x axis, the accelerometer can also be misaligned along the y-axis.

In general, the examples of adaptive compensation of accelerometer misalignment from driving data described above operate under the assumption that the data measured at the IMU is sufficiently accurate. Thus, in some examples, the IMU is calibrated or designed in such a way that its accuracy is sufficient for the operation of the adaptive compensation system.

Alternatives

In some examples, instead of using a proprietary IMU, fore/aft, lateral, and yaw measurements can be derived from a pre-existing vehicle stability control system.

In some examples, a proprietary, reference IMU can be used in calibration step and then removed from the vehicle. A pre-existing vehicle stability control system can then be used when the vehicle is in operation.

In the above description, the acceleration sensors located at the four corners of a vehicle are described as accelerometers. However, other types of acceleration sensors may be used.

In general, any representation of the misalignment of an acceleration sensor can be considered to be data characterizing misalignment of the acceleration sensor. For example, pitch and roll angles of an accelerometer's sensitivity vector are data characterizing misalignment of the accelerometer.

In general, the adaptive systems described above determine an estimated misalignment of an accelerometer at a calibration time and make subsequent updates to the estimate of the misalignment during operation of a vehicle.

Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, digital signal processors (DSPs) and both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In some examples, the systems such as those illustrated in FIGS. 6 and 7 of the present application are implemented entirely using a general purpose on-board vehicle computer. In other examples, a special purpose computer is dedicated to implementation of the system. In some examples, the system is integrated with one or more vehicle accelerometer units. In other examples, the system is integrated with an on board inertial measurement unit (IMU). In yet other examples, certain modules of the system are integrated with vehicle accelerometer units or an IMU unit while other modules of the system are implemented using a general purpose vehicle computer or a special purpose computer.

It is to be understood that the foregoing description is intended to illustrate and not to limit the scope of the invention, which is defined by the scope of the appended claims. Other embodiments are within the scope of the following claims.

What is claimed is:

1. A method for compensating for a misalignment characteristic of one or more acceleration sensors fixed to a sprung mass of a vehicle, each acceleration sensor having a location on the vehicle and a desired orientation relative to the vehicle, the method comprising:
   mounting an inertial measurement unit (IMU) to the sprung mass of the vehicle;
   calibrating the IMU;
   operating the vehicle through a series of maneuvers;
   recording from the IMU, while the vehicle is operating, x, y, and z axis acceleration data and three components of angular acceleration data;
   recording from the one or more acceleration sensors, while the vehicle is operating, z axis acceleration data;
   extrapolating by a controller the x, y, and z axis acceleration data obtained from the IMU to x, y, and z axis acceleration data at the locations of the one or more acceleration sensors, the extrapolation based on the recorded IMU angular acceleration data and the recorded NU x, y, and z axis acceleration data;
   determining by the controller data characterizing a degree of misalignment of the one or more acceleration sensors based on the x, y, and z axis acceleration data extrapolated from the recorded IMU x, y, and z axis acceleration data, the recorded angular acceleration data, and the recorded z-axis acceleration data from the one or more acceleration sensors; and
   forming for each of the one or more acceleration sensors a corrected acceleration signal based on the data characterizing the degree of misalignment of the one or more acceleration sensors.

2. The method of claim 1 wherein after the data characterizing the degree of misalignment of the one or more acceleration sensors has been determined, the IMU is removed from the vehicle.

3. The method of claim 1 wherein the controller is further configured to, for each acceleration sensor of the one or more acceleration sensors,
   form a control signal based on the corrected acceleration signal; and
   provide the control signal to an active suspension element associated with the acceleration sensor.

4. The method of claim 1 wherein the IMU is calibrated using a tilt calibration method.

5. The system of claim 1 wherein the controller is further configured to determine the data characterizing the degree of misalignment of the one or more acceleration sensors by adaptively determining the degree of misalignment of the acceleration sensor during operation of the vehicle.

6. The system of claim 5 wherein the controller is further configured to determine the data characterizing misalignment of the acceleration sensor including determining the data characterizing misalignment of the acceleration sensor at a calibration time and subsequently updating the data characterizing misalignment of the acceleration sensor during operation of the vehicle.

7. The method of claim 1 wherein the vehicle includes four corners, each corner including:
   a suspension actuator coupled to the sprung mass;
   a wheel coupled to the suspension actuator; and
   an acceleration sensor of the one or more acceleration sensors coupled to the sprung mass in the vicinity of the location where the suspension actuator is coupled to the sprung mass.

8. The method of claim 7 wherein the IMU is not mounted in close proximity to the suspension actuators.

* * * * *

UNITED STATES PATENT AND TRADEMARK OFFICE
CERTIFICATE OF CORRECTION

PATENT NO. : 9,952,253 B2
APPLICATION NO. : 14/957733
DATED : April 24, 2018
INVENTOR(S) : Upendra Ummethala et al.

It is certified that error appears in the above-identified patent and that said Letters Patent is hereby corrected as shown below:

In the Claims

At Column 15, Line 49, delete "NU" and replace with -- IMU --

Signed and Sealed this
Twenty-fifth Day of September, 2018

Andrei Iancu
*Director of the United States Patent and Trademark Office*